(12) United States Patent
Haines et al.

(10) Patent No.: US 8,392,527 B2
(45) Date of Patent: Mar. 5, 2013

(54) SYSTEM AND METHOD FOR REQUESTING COMPUTER RESOURCES

(75) Inventors: Robert E. Haines, Boise, ID (US); Mark A. Harper, Middleton, ID (US); Kenley Hinrichs, Meridian, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 3598 days.

(21) Appl. No.: 09/874,104

(22) Filed: Jun. 4, 2001

(65) Prior Publication Data
US 2002/0184338 A1 Dec. 5, 2002

(51) Int. Cl.
*G06F 15/16* (2006.01)
(52) U.S. Cl. .......................... 709/218; 709/217; 709/219
(58) Field of Classification Search .................. 709/203, 709/217–219
See application file for complete search history.

(56) References Cited

U.S. PATENT DOCUMENTS

| | | | | |
|---|---|---|---|---|
| 5,068,807 A * | 11/1991 | Ikenoue | ........................ | 358/1.16 |
| 5,774,670 A * | 6/1998 | Montulli | ........................ | 709/227 |
| 5,826,242 A * | 10/1998 | Montulli | ........................ | 705/27 |
| 5,999,914 A | 12/1999 | Blinn et al. | ........................ | 705/26 |
| 6,076,108 A * | 6/2000 | Courts et al. | ........................ | 709/227 |
| 6,112,240 A | 8/2000 | Pogue et al. | ........................ | 709/224 |
| 6,115,040 A * | 9/2000 | Bladow et al. | ........................ | 715/741 |
| 6,170,017 B1 | 1/2001 | Dias et al. | ........................ | 709/235 |
| 6,189,000 B1 | 2/2001 | Gwertzman et al. | ........................ | 707/1 |
| 6,226,752 B1 * | 5/2001 | Gupta et al. | ........................ | 726/9 |
| 6,377,993 B1 * | 4/2002 | Brandt et al. | ........................ | 709/227 |
| 6,421,729 B1 * | 7/2002 | Paltenghe et al. | ........................ | 709/229 |
| 6,421,768 B1 * | 7/2002 | Purpura | ........................ | 711/164 |
| 6,529,952 B1 * | 3/2003 | Blumenau | ........................ | 709/223 |
| 6,539,424 B1 * | 3/2003 | Dutta | ........................ | 709/219 |
| 6,631,402 B1 * | 10/2003 | Devine et al. | ........................ | 709/217 |
| 6,715,080 B1 * | 3/2004 | Starkovich et al. | ........................ | 726/7 |
| 6,748,420 B1 * | 6/2004 | Quatrano et al. | ........................ | 709/205 |
| 6,813,039 B1 * | 11/2004 | Silverbrook et al. | ........................ | 358/1.18 |
| 6,934,736 B2 * | 8/2005 | Sears et al. | ........................ | 709/203 |
| 6,963,668 B2 * | 11/2005 | Engeldrum et al. | ........................ | 382/233 |
| 7,039,699 B1 * | 5/2006 | Narin et al. | ........................ | 709/224 |
| 7,058,600 B1 * | 6/2006 | Combar et al. | ........................ | 705/34 |
| 7,137,006 B1 * | 11/2006 | Grandcolas et al. | ........................ | 713/180 |
| 7,139,814 B2 * | 11/2006 | Dinovo | ........................ | 709/219 |
| 2002/0007317 A1 * | 1/2002 | Callaghan et al. | ........................ | 705/26 |
| 2002/0032731 A1 * | 3/2002 | Qian et al. | ........................ | 709/204 |
| 2002/0073152 A1 * | 6/2002 | Andrew et al. | ........................ | 709/204 |
| 2002/0078192 A1 * | 6/2002 | Kopsell et al. | ........................ | 709/223 |
| 2002/0133540 A1 * | 9/2002 | Sears et al. | ........................ | 709/203 |
| 2002/0143861 A1 * | 10/2002 | Greene et al. | ........................ | 709/203 |
| 2002/0178070 A1 * | 11/2002 | Leveridge | ........................ | 705/26 |
| 2004/0015580 A1 * | 1/2004 | Lu et al. | ........................ | 709/224 |

FOREIGN PATENT DOCUMENTS

| | | |
|---|---|---|
| WO | WO99/64967 | 12/1999 |
| WO | WO0071321 A2 | 11/2000 |
| WO | WO0152168 A1 | 7/2001 |

* cited by examiner

*Primary Examiner* — Kristie Shingles

(57) ABSTRACT

A System including a first WEB client, a second WEB Client, and a remote computer is described. The remote computer is operable to pool cookies received by both the first and the second WEB clients. In one implementation, the system is used by multiple users to purchase items, such as printer cartridges, from an online shopping system.

16 Claims, 14 Drawing Sheets

SYSTEM AND METHOD FOR REQUESTING COMPUTER RESOURCES

BACKGROUND OF THE INVENTION

An important use of computers is the transfer of information over a network. Currently, the largest computer network in existence is the INTERNET. The INTERNET is a worldwide interconnection of computer networks that communicate using a common protocol. Millions of computers, from low end personal computers to high-end super computers are coupled to the INTERNET.

In 1989, a new type of information system known as the World-Wide-Web ("the Web") was introduced to the INTERNET. The Web is a wide-area hypermedia information retrieval system aimed to give wide access to a large universe of WEB documents and other types of http resources.

The architecture of the Web follows a conventional client-server model. The terms "client" and "server" are used to refer to a computer's general role as a requester of data (the client) or provider of data (the server). Under the Web environment, browsers reside in WEB clients and http resources reside in WEB servers. Web clients and Web servers communicate using a protocol called "HYPERTEXT Transfer Protocol" (http). A WEB client opens a connection to a server and initiates an http request for an http resource. The WEB server responds to the request by delivering the requested http resource.

When a server responds to an http request by returning an http resource to a client, the server may also send a piece of state information that the client will store. The state information is often referred to as a "cookie". Included in the state information (the cookie) is a description of a range of URLs for which the state information should be repeated back to. Thus, when the client sends future http requests to servers that fall within the range of URLs defined by the cookie, the requests will include a transmittal of the current value of the state object. By using this ability to transfer state information back and forth, Web servers can play an active role in transactions between clients and servers.

For purposes of this application, a cookie is referred to as being "valid" for a URL if the URL falls within the range of URL's defined by the cookie.

The use of cookies has enabled the implementation of a large number of WEB based applications. Examples of such applications include online shopping systems that store information about items currently selected by customers, for-fee on-line services that can send back registration information (thereby freeing users from retyping a user-id upon the next connection), and Web sites that can store per-user preferences on the client system and have the client supply those preferences every time the site is later accessed.

A further explanation of cookies can be found in U.S. Pat. No. 5,7444,670, entitled "Persistent client state in a hypertext transfer protocol based client-server system". That patent is incorporated herein by this reference.

SUMMARY OF THE INVENTION

The present invention may be implemented as a method of requesting a resource having a URL from a WEB server. The method preferably includes transmitting a first request to a remote computer for a cookie that is valid for the URL, then receiving a first cookie from the remote computer; and transmitting both the first cookie and a request for the resource to the WEB Server.

In a preferred embodiment of a computing device according to the invention, the computing device is operable to receive a first cookie that is valid for a first range of URL's from a first WEB client. The computing device is further operable to receive a first request from a second WEB client and to respond to the request by transmitting the first cookie to the second WEB client.

In a preferred embodiment of a WEB client System according to the invention, the system includes a first WEB client and a second WEB Client. The first WEB Client is operable to receive a first resource and a first cookie from a first WEB Server and is configured to automatically respond to receiving the first resource by processing the first resource. The first WEB client is further configured to automatically respond to receiving the first cookie by transmitting the first cookie to a remote computer.

The system may further include a second WEB client operable to receive a second resource and a second cookie from a second WEB server and configured to automatically respond to receiving the first resource by processing the first resource. The second WEB client is further configured to automatically respond to receiving the first cookie by transmitting the first cookie to the remote computer.

Other aspects and advantages of the present invention will be become apparent from the following detailed description, taken in conjunction with the accompanying drawings, illustrating by way of example the principles of the invention.

DETAILED DESCRIPTION OF THE INVENTION

Figure 1:
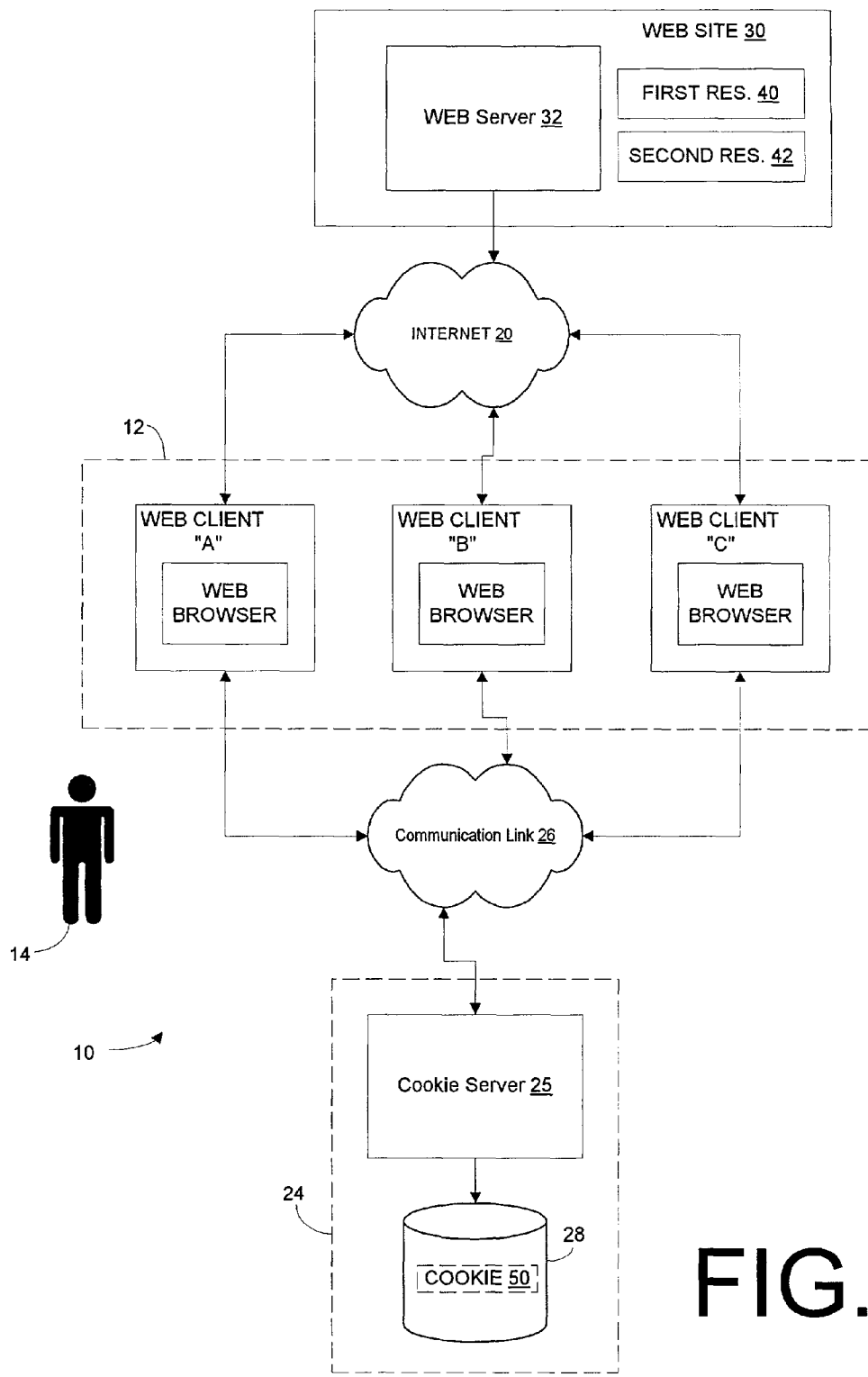
FIG. 1 is a block diagram of a computing system embodying the invention.

As shown in FIG. 1, for purposes of illustration, the invention is embodied in a novel computing system 10. The computing system 10 includes a group of WEB Clients 12 which are designated as follows: WEB Client "A", WEB Client "B"

and WEB Client "C". Each client includes a WEB Browser that is operable by a user to retrieve http resources over the INTERNET 20.

To illustrate a feature of the invention, it will be assumed for this example that the WEB Clients 12 are owned and operated by a single user 14. For example, WEB client "A" may represent the user's personal desk-top personal computer; WEB client "B" may represent the user's personal digital assistant (PDA); and WEB client "C" may represent the user's personal laptop.

Additionally, each one of the WEB Clients 12 are connected to a remote computing device 24 over a communication link 26. The communication link 26 may represent any type of communication system (e.g., an Intranet, the INTERNET, a parallel port, etc). Hereafter, the remote computing device 24 will be referred to as the "cookie store" 24. The cookie store 24 includes a server program 25 and a memory 28. The server program 25 will be referred to as the "cookie server" 25.

Figure 2:
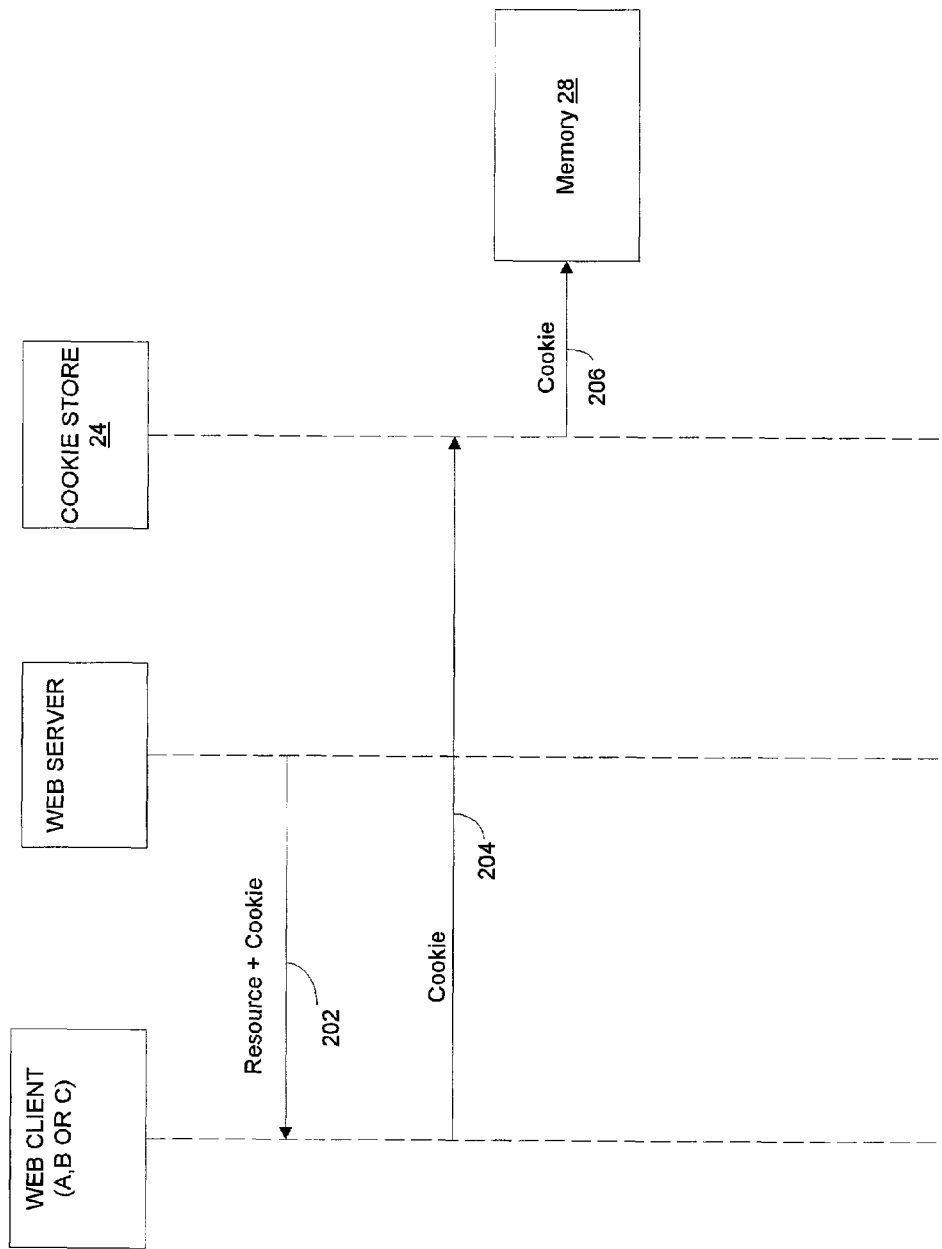
FIG. 2 is a first sequence diagram illustrating the operation of a group of WEB clients to pass cookies to a remote computer.
Figure 3:
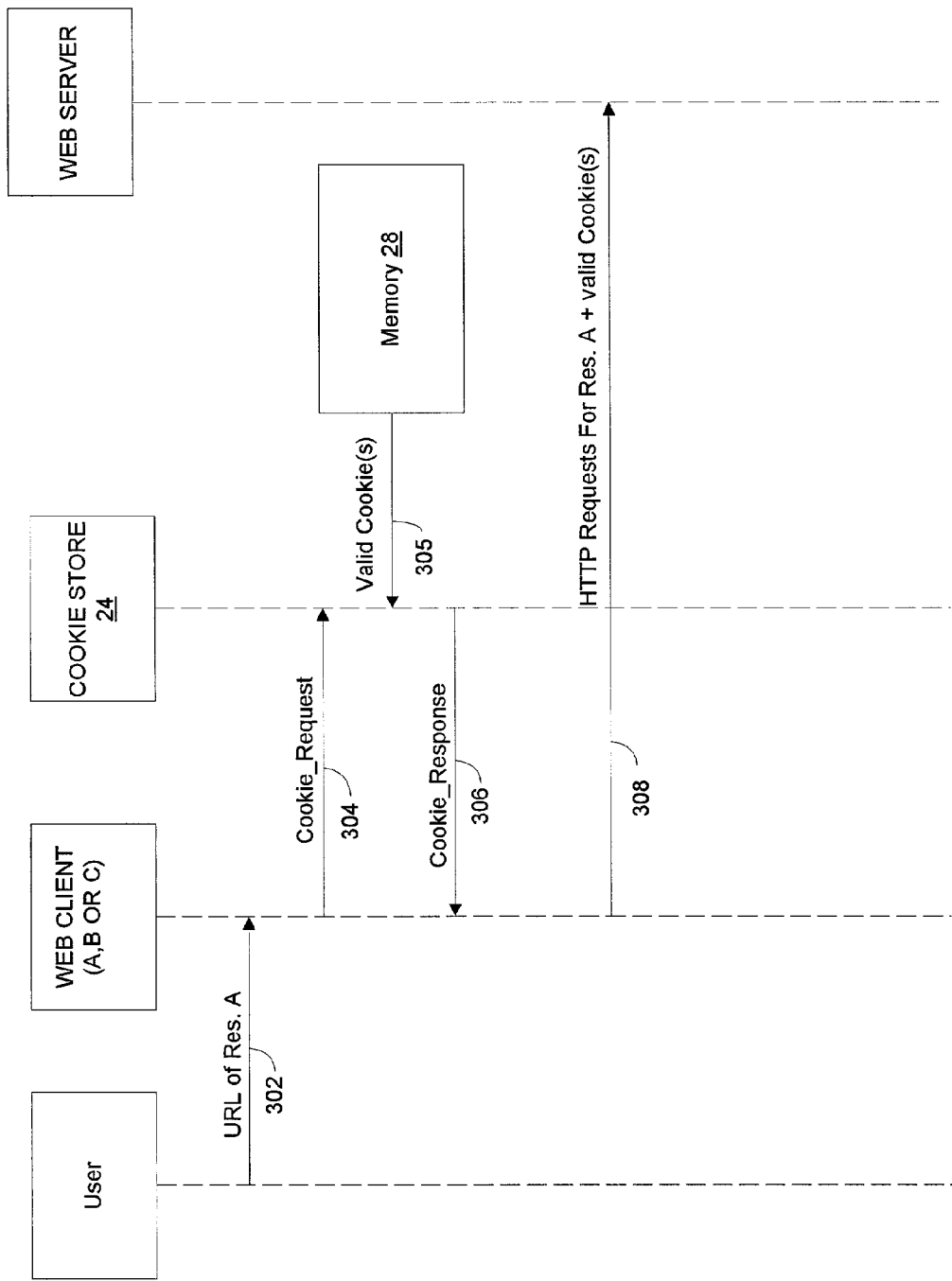
FIG. 3 is a second sequence diagram illustrating the operation of the WEB clients to request a resource over the INTERNET.

In general, each of the three WEB Clients 12 are configured to transmit cookies, received from WEB Servers over the INTERNET 20, to the cookie store 24. The cookie store 24 responds, under the direction of the cookie server 25, by storing the received cookies into the memory 28. Any one of the WEB Clients can also transmit a request to the cookie store 24 to retrieve cookies stored in the memory 28. FIG. 2 and FIG. 3 illustrate this functionality.

FIG. 2 is a first sequence diagram illustrating the operation of the WEB clients to transmit cookies to the cookie store 24. The box labeled "WEB Client", may represent any one of the three clients as all three are configured to handle cookies in a similar manner.

Turning now to FIG. 2, when a WEB Site transmits an http resource plus a cookie to a WEB client (transaction 202), the WEB client operates to transmit the cookie to the cookie store 24 over the communication link 26 (transaction 204). The cookie store 24 responds, under the direction of the cookie server 25, by storing the cookie in the memory 28 (transaction 206).

FIG. 3 is a second sequence diagram illustrating the operation of the WEB clients to request an http resource over the INTERNET 20. The box labeled "WEB Client", may represent any one of the three clients as all three are configured to handle cookies in a similar manner.

Turning now to FIG. 3, the user 14 first provides a URL of an http resource (resource "A") to a WEB client (transaction 302). The WEB client is configured to respond by first transmitting a request to the cookie store 24 (transaction 304). We will refer to this request as a "cookie_request". In this example, the cookie_request includes the URL that was just inputted by the user 14.

Importantly, the cookie store 24, under the direction of the cookie server 25, responds to the request by identifying any unexpired cookies that are presently stored in the memory 28 and that are valid for the URL. This is regardless of which client originally sent the cookie. If one or more valid cookies are identified, the cookie store 24 retrieves the identified cookie(s) from the memory 28 (transaction 305) and transmits a response ("cookie_response") that includes the identified cookie(s) (transaction 306).

The WEB Client receives the cookie_response. Assuming the cookie_response includes a valid cookie, the WEB Client transmits the valid cookie along with the appropriate http requests for "resource A" to the appropriate WEB Server (transaction 308).

For clarification purposes, lets now consider a simple example. Referring now to FIG. 1, assume that a WEB Site 30 exists. The WEB site 30 includes a WEB Server 32, a first resource 40 and a second resource 42. The first resource 40 has a URL that will be referred to as "URL #1". The second resource 42 has a URL that will be referred to as "URL #2". Also assume an initial condition that the cookie store 24 is not storing any cookies that are valid for these two URL's.

Now assume that WEB client "A" receives the URL #1 from the user 14. In response, the WEB client A first transmits a cookie_request to the cookie store 24. The cookie_request includes the "URL #1". The cookie store 24 receives the cookie_request and responds thereto by transmitting a cookie_response to WEB client "A". Because the cookie store 24 is not presently storing a cookie that is valid for URL #1, the cookie_response, does not include a cookie.

The WEB Client "A", after receiving the cookie_response, transmits an appropriate http request for the first resource 40 to the WEB Server 32. The http request does not include a cookie.

The WEB Server 32 responds by transmitting the first resource 40, along with a cookie 50, to the WEB Client "A". The WEB Client "A" operates to automatically transmit the cookie 50 to the cookie store 24. The cookie store 24 receives and stores the cookie 50 in the memory 28. The cookie 50 is valid for both URL #1 and URL #2.

After the cookie 50 is stored by the cookie store 24, the WEB Client "B" receives the URL #2 from the user 14. In response, the WEB client B first transmits a cookie_request to the cookie store 24. The cookie_request includes the "URL #2". The cookie store 24 receives the cookie_request and responds thereto by transmitting a cookie_response to WEB client "B". Because the cookie store 24 is presently storing the cookie 50 that is valid for URL #1, the cookie_response includes the cookie 50.

The WEB Client "B", after receiving the cookie_response, transmits an appropriate http request for the second resource 42 to the WEB Server 32. Importantly, the http requests include the cookie 50.

It can be seen from the above example that the present invention provides a powerful new feature for user's of multiple WEB based devices. By use of the present invention, a WEB Server can introduce a cookie to a group of associated WEB clients simultaneously. This can be very useful to a single individual that makes use of multiple devices to access the WEB.

For example, it can be seen that by using the invention, a WEB Site can assign a user ID to a user during a session with one of his/her WEB devices. This ID can then be repeated back (in the form of a cookie) from all of his/her WEB devices. This allows the WEB site to apply the same user preferences to all of the user's WEB devices in a uniform way.

The present invention can also be useful to a group of individuals that access the WEB for some common purpose. The next embodiment illustrates this important feature of the invention.

Figure 4:
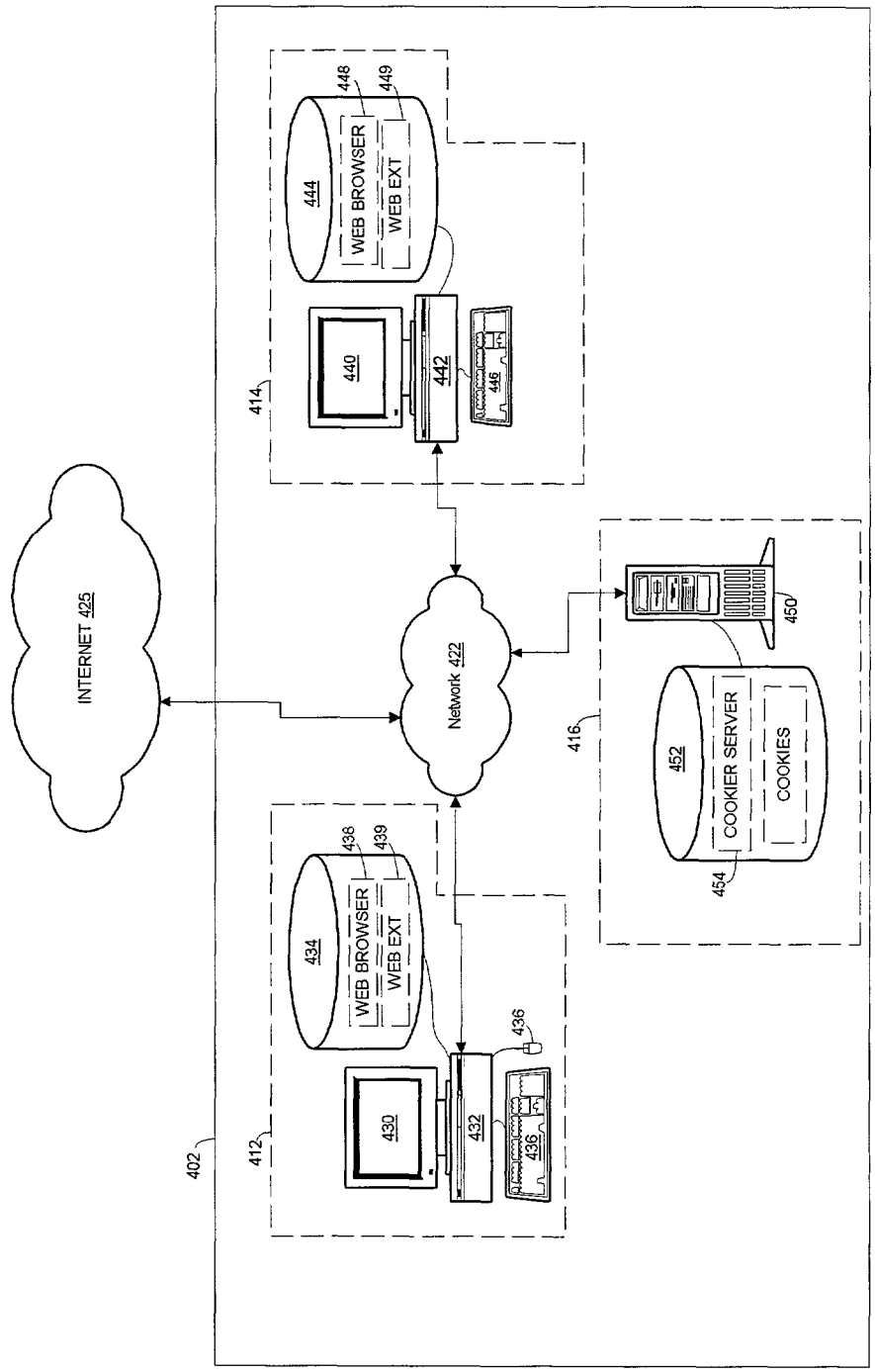
FIG. 4 illustrates a second exemplary embodiment of the invention in the form of a cookie management system.

FIG. 4 illustrates a second exemplary embodiment of the invention in the form of a cookie management system 402. The cookie management system 402 includes a first computer 412, a second computer 414 and a cookie store 416 all connected over a network 422. It is assumed in this embodiment that one user typically makes use of the first computer 412 and a second user typically makes use of the second computer 414.

The first computer 412 includes several conventional hardware components including a display monitor 430, a processing unit 432, a memory 434 and user input devices 436. Stored in the memory 434 is a WEB Browser 438 and a WEB Extension 449. The processing unit 432 can retrieve and then execute the WEB Browser 438. The WEB Extension 439 enables the WEB Browser 438 to transmit and retrieve cookies from the cookie store 416. The WEB Browser 438 provides a graphical user interface (GUI) for a user and allows a user to retrieve http resources from the WEB. While executing the WEB Browser 438, therefore, the first computer 412 functions as a WEB client. For this reason, hereafter the first computer 412 will be referred to as the "first WEB client 412".

Similarly, the second computer 414 includes a display monitor 440, a processing unit 442, a memory 444 and user input devices 446. Stored in the memory 444 is a WEB Browser 448 and a WEB Extension 449. The processing unit 442 can retrieve and then execute the WEB Browser 448. The WEB Extension 449 enables the WEB Browser 448 to transmit and retrieve cookies from the cookie store 416. The WEB Browser 448 provides a graphical user interface (GUI) for a user and allows a user to retrieve http resources from the WEB. While executing the WEB Browser 448, therefore, the second computer 412 functions as a WEB client machine. For this reason, hereafter the second computer 414 will be referred to as the "second WEB client 414".

The cookie store 416 includes a processing unit 450 and a memory 452. The memory 452 includes a cookie server program 454. The processing unit 450 can retrieve and execute this program.

It is important to note that in each of the computer's just described, the memory shown may include both volatile and nonvolatile components. Volatile components are those that do not retain data upon loss of power. Nonvolatile components are those that retain data upon loss of power. Thus each one of the memories shown may comprising, for example, random access memory (RAM), read only memory (ROM), hard disk(s), floppy disk(s), compact disk(s), magnetic tape(s) and/or other memory components, or any combination of any two or more of these memory components. Furthermore, in each case the memories are shown as being externally connected to their respective processing units. In actual implementations the memories may in fact be located internally or externally or some combination thereof.

System Communication

Figure 5:
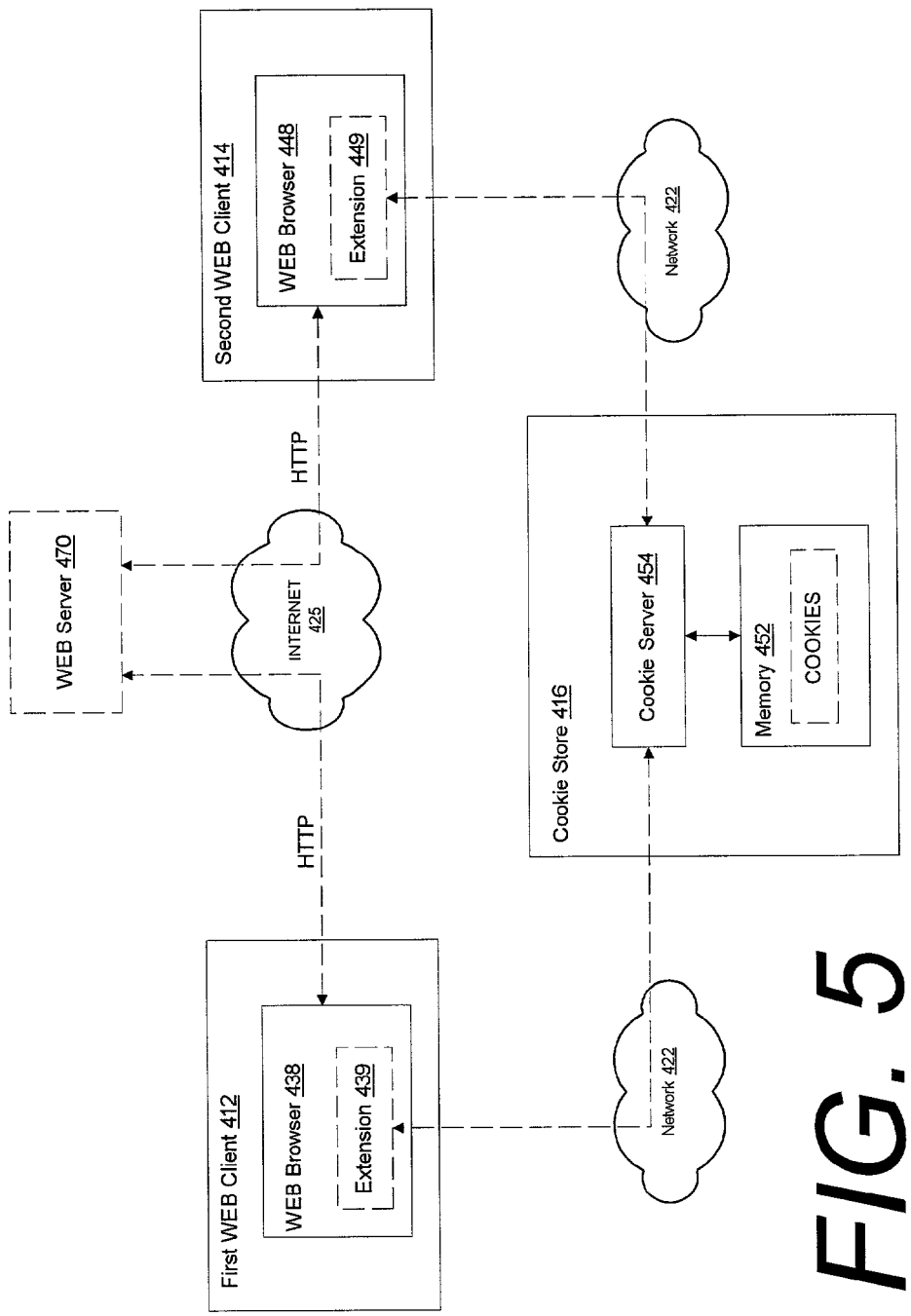
FIG. 5 illustrates how the various software programs in the cookie management system can communicate.

FIG. 5 illustrates how the various executing software programs can communicate over the Internet 425 and over the network 422. Turning now to FIG. 5, the WEB Browser 438 and the WEB Browser 448 can communicate with WEB Servers, such as a WEB Server 470, over the INTERNET 425 by using the http protocol.

Additionally, both the WEB browser 438 and the WEB browser 448 can transmit cookies (as they are received from WEB servers) to the cookie server 454 over the network 422. The two browsers can also retrieve, over the network 422, the cookies back from the cookie server 454. As noted above, the functionality of the WEB Browsers to transmit and retrieve cookies is provided by each browser's respective WEB extensions.

Operation of Each WEB Client

Figure 6A:
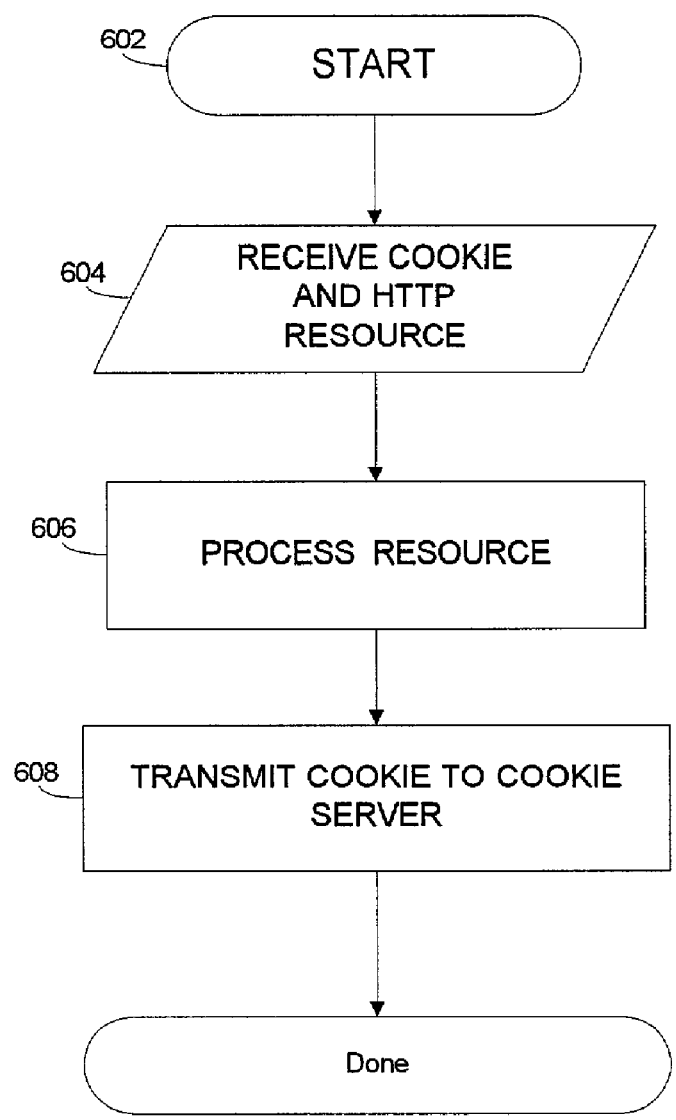
FIG. 6A is a flow diagram illustrating the operation of each of the two WEB clients in the cookie management system upon receiving a cookie from a WEB server.

FIG. 6A is a flow diagram illustrating the operation of each of the two WEB clients upon receiving a cookie from a WEB server. Turning now to FIG. 6A, the WEB Client (i.e., either the WEB client 412 or the WEB client 414) receives the cookie (along with an http resource) at step 604. In response, the WEB Client operates to process the http resource in a standard manner (step 606). In addition, the WEB Client operates to transmit the cookie to the cookie store 416 (step 608). The Cookie store 416 receives the cookie and stores it in the memory 452.

Figure 6B:
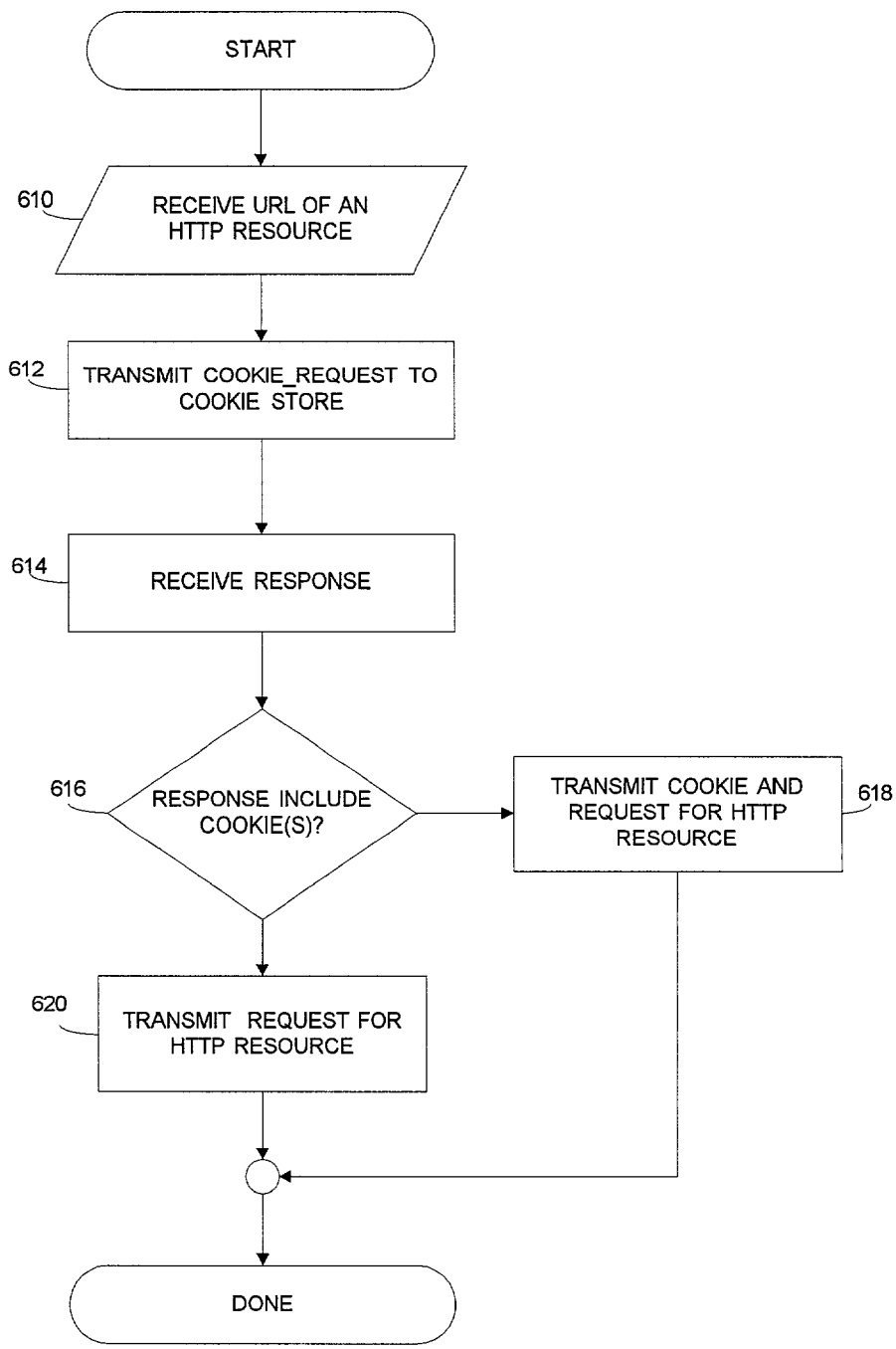
FIG. 6B is a flow diagram illustrating the operation of each of the two WEB clients to retrieve an http resource from a WEB server.

FIG. 6B is a flow diagram illustrating the operation of each of the two WEB clients to retrieve an http resource from a WEB server. Turning now to FIG. 6B, at step 610 the WEB client receives a URL of an http resource from its respective user (step 610).

In response, the WEB Client operates to transmit a cookie_request to the cookie store 416 (step 612). The cookie_request includes the URL that was received at step 610. The cookie store 416 responds by returning a cookie_response, the response includes any unexpired cookies, presently stored in the memory 452, that are valid for the URL.

The WEB Client receives the cookie_response at step 614. If the response includes a cookie, the WEB client operates to transmit the cookie, along with an http request for the http resource, to the appropriate WEB server (step 618).

If the cookie_response does not include a cookie, the WEB client operates to simply transmit an http request for the http resource to the appropriate WEB Server (step 620).

Operation of the Cookie Store

Figure 7A:
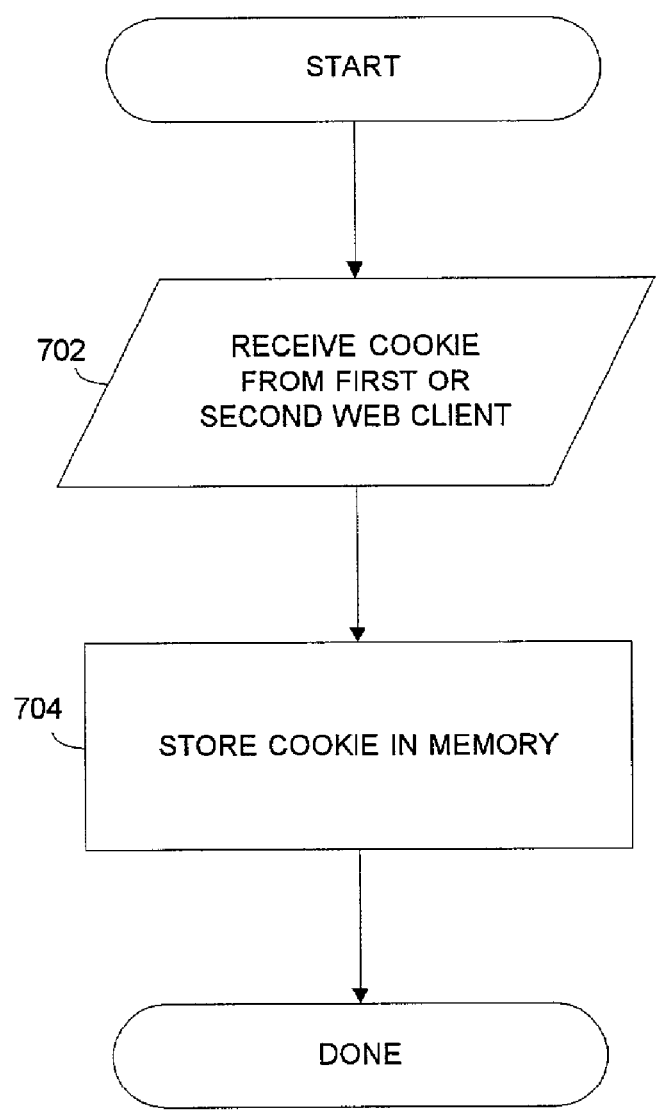
FIG. 7A is a flow diagram illustrating the operation of a cookie store upon receiving a cookie from either of the two WEB clients.

FIG. 7A is a flow diagram illustrating the operation of the cookie store 416, under the direction of the cookie server 454, upon receiving a cookie from either of the two WEB clients. Turning now to FIG. 7A, the cookie store 416 receives the cookie at step 702. In response, the cookie store 416 stores the cookie in the memory 452 so that it can later be retrieved by either of the two WEB Clients (step 704).

Figure 7B:
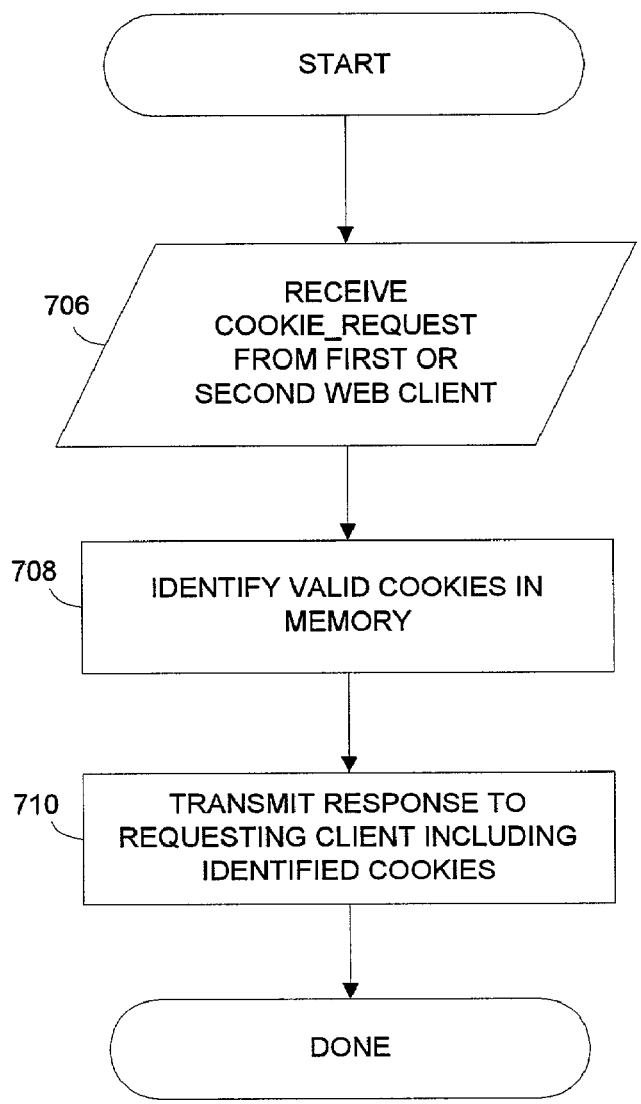
FIG. 7B is a flow diagram illustrating the operation of the cookie store upon receiving a cookie_request from either of the two WEB Clients.

FIG. 7B is a flow diagram illustrating the operation of the cookie store 416, under the direction of the cookie server 454, upon receiving a cookie_request (including a URL) from either of the two WEB Clients. Turning now to FIG. 7B, the cookie store 416 receives the cookie_request at step 706.

In response, the cookie store 416 operates of identify any unexpired cookies, presently stored in the memory 452, that are valid for the URL (Step 708). The cookie store 416 then transmits a cookie_response to the requesting WEB Client (step 710). Importantly, the cookie_response includes the cookie(s) identified at step 708.

Exemplary Set of Transactions

Figure 8:
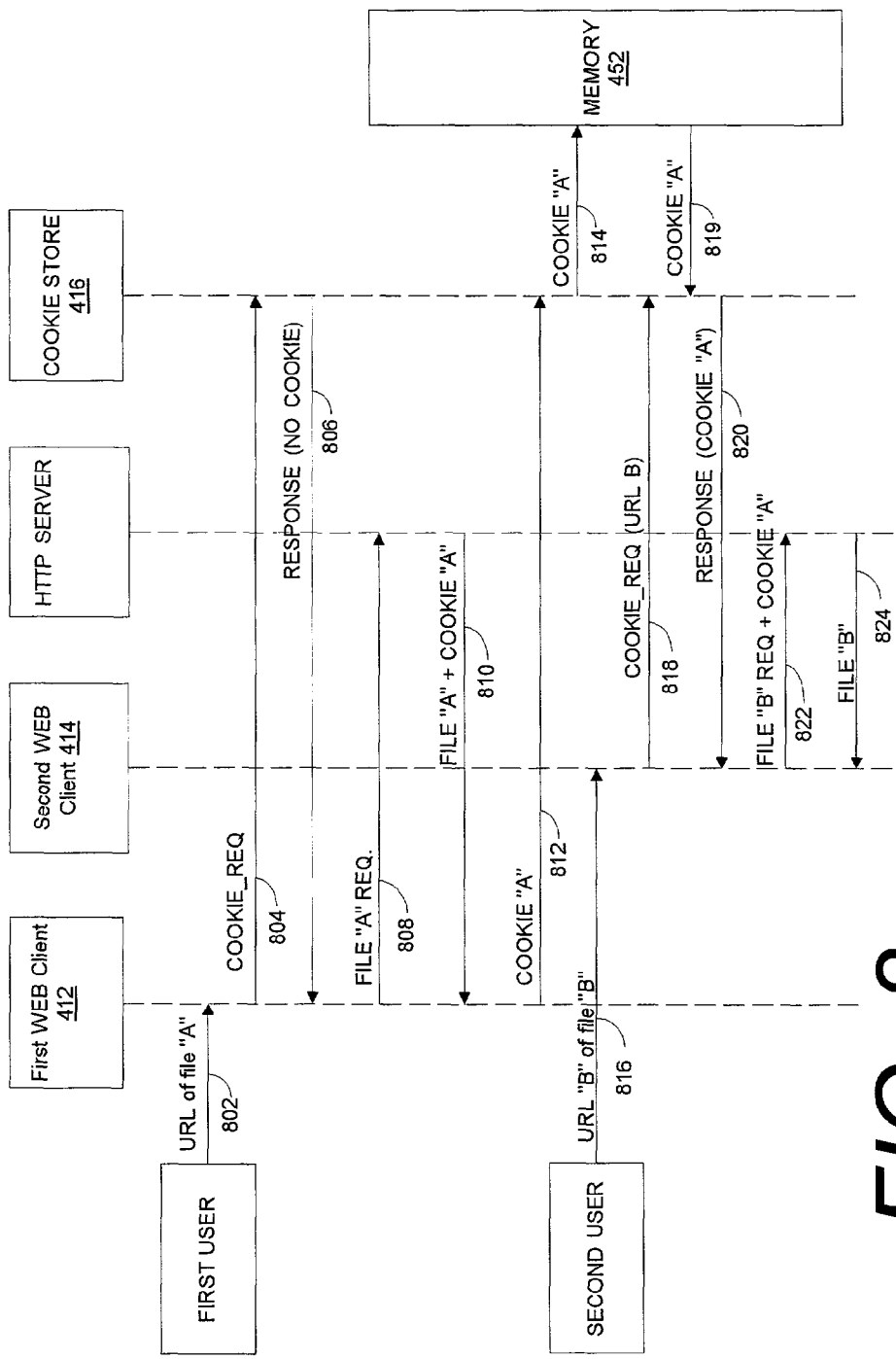
FIG. 8 is a diagram illustrating an exemplary sequence of transactions that can occur between the various components in the cookie management system.

FIG. 8 is a diagram illustrating an exemplary sequence of transactions that can occur between the various components in the cookie management system 402. First, it is assumed that a first user provides input, that defines a URL associated with an http resource, to the first WEB client 412 (first transaction 802). The URL will be referred to as "URL A". The http resource will be referred to as "file A".

In response to this user input, the first WEB client 412 operates to transmit a cookie_request to the cookie store 416 (second transaction 804). The cookie_request includes "URL A".

In response to receiving the cookie_request, the cookie store 416 accesses the memory 452 to identify any unexpired cookies that are valid for "URL A". In this example, the cookie Store 416 is not presently storing any cookies that are valid for this URL. As a result, the Cookie store 416 transmits a cookie_response, that does not include a cookie, to the first WEB client 412 (third transaction 806).

The First WEB Client 412 receives the cookie_response and then transmits an http request to the appropriate WEB Server for file A (fourth transaction 808). The WEB Server is assumed to respond by transmitting file "A" and a cookie (cookie "A") to the first WEB client 412 (fifth transaction 810).

The First WEB client 412 operates to transmit Cookie "A" to the cookie store 416 (sixth transaction 812). The cookie store 416 receives Cookie "A" and stores it in the memory 452 (seventh transaction 814). Cookie "A" is assumed to be valid for URL "A" and a URL "B".

Next, it is assumed that a second user provides input, that defines URL "B", to the second WEB client 414 (eight transaction 816). In response, the second WEB client 414 operates to transmit a cookie_request for any unexpired cookies that are valid for "URL B" (ninth transaction 818) to the cookie store 416. In response, the cookie store 416 identifies and retrieves Cookie "A" from the memory 452 (tenth transaction 819). The cookie Store 416 then transmits a cookie_response to the second WEB Client 414 (eleventh transaction 820). The response includes "Cookie A".

After receiving the response, the second WEB client 414 operates to transmit both an appropriate http request for file B and "Cookie A" to the appropriate WEB Server (twelfth transaction 822). The WEB server responds by transmitting file "B" (last transaction 824).

Use of the Cookie Management System

It can be seen by a person skilled in the art, having benefit of this disclosure, that the cookie management system 402 just described can be used for a wide range of purposes. In particular, the cookie management system can be used to pool cookies among multiple users that access the WEB for some common purpose. To illustrate one specific example of this important aspect of the invention, consider FIG. 9.

Figure 9:
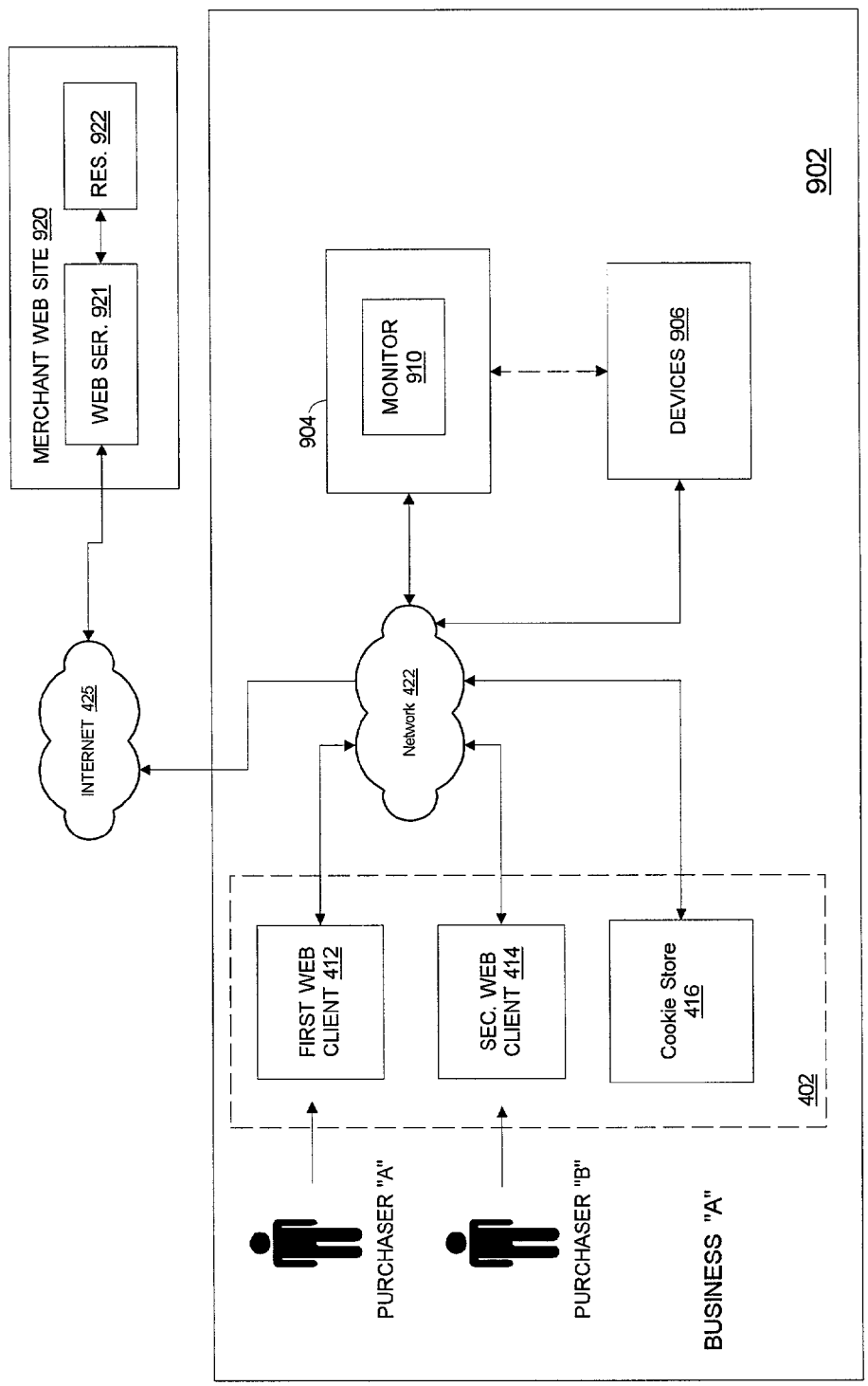
FIG. 9 shows a third embodiment of the invention in the form of a computing system that incorporates the cookie management system.

FIG. 9 shows a third embodiment of the invention in the form of a computing system 902. The computing system 902 includes the cookie management system 402 that was just described. Additionally, the computing system 902 includes a device monitoring system 904 and a set of devices 906 (e.g., laser printers and/or ink printers). In this simplified example, the devices 906 are assumed to be printing devices that make use of a consumable supply that is delivered from a replaceable cartridge (e.g., a toner cartridge and/or ink cartridge). Hereafter, the replaceable cartridges will generally be referred to simply as "cartridges".

As indicated in FIG. 9, it is assumed the computing system 902 is owned and operated by "Business A". Purchaser A and Purchaser B are both employees of Business "A" and are each responsible (at different times) to place orders for replacement cartridges. They both fulfil this responsibility by making use of a Merchant's WEB site 920.

Merchant WEB Site

The Merchant's WEB site 920 (e.g., "HPSHOPPING. COM") includes a WEB Server 921 and a set of http resources 922 (e.g., HTML pages, programs to generate HTML pages, etc) that form a conventional WEB based shopping system to allow customers to purchase products. One category of product that can be purchased is replacement cartridges.

The shopping system may, for example, allow customers to browse information that describes replacement cartridges that can be purchased. When a desired product is found, the customer can place the product into a "virtual shopping basket". At check-out time, the customer may pay for the selected products by using some type of payment system such as a credit card. After payment is received, the WEB based shopping system notifies the appropriate facility of the order. The facility then ships the selected products to the customer.

Importantly, for this discussion, the Merchant's WEB site 920 makes use of cookies to assign an ID to customers and to have the ID repeated back each time the customer visits the site. The WEB site 920 associates the ID with certain information in a database. In this example, the WEB Site 920 may associate the ID with credit card information, certain user preferences and a shipping address.

Operation of the Printing Devices 906

In general, the printing devices 906 may all operate in a standard manner. Importantly, however, in this example, each printing device includes the capability to monitor its own level of consumable supply. Once the consumable supply drops below a pre-defined level, a "consumable low signal" is sent over the network 422 to the monitoring computer 904. The consumable low signal identifies the transmitting printer and indicates that the cartridge in the transmitting printer will soon need replacement. Additionally, in this example, the consumable low signal indicates the model number of the cartridge that needs to be replaced.

Operation of the Monitoring Computer 904

Figure 10:
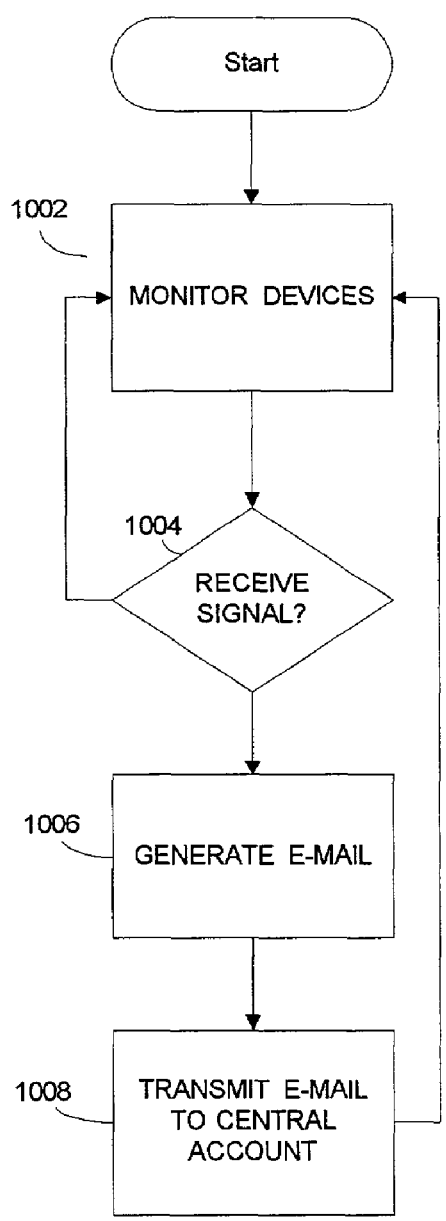
FIG. 10 is a flow diagram illustrating the operation of a device monitoring computer.

The monitoring computer 904 includes a "monitoring program" 910. FIG. 10 is a flow diagram illustrating the operation of the monitoring computer 904 as directed by the monitoring program 910.

Turning now to FIG. 10, the monitoring computer 904 continuously monitors the devices 906 for a "consumable low signal" (step 1002). Once the device monitor computer 910 determines that a consumable low signal has been received (step 1004), an e-mail notification message is then generated (step 1006) and then transmitted to a central e-mail account (step 1008). For ease of discussion, the e-mail notification that is transmitted at step 1008 is referred to herein as a "consumable low" e-mail.

Figure 11:
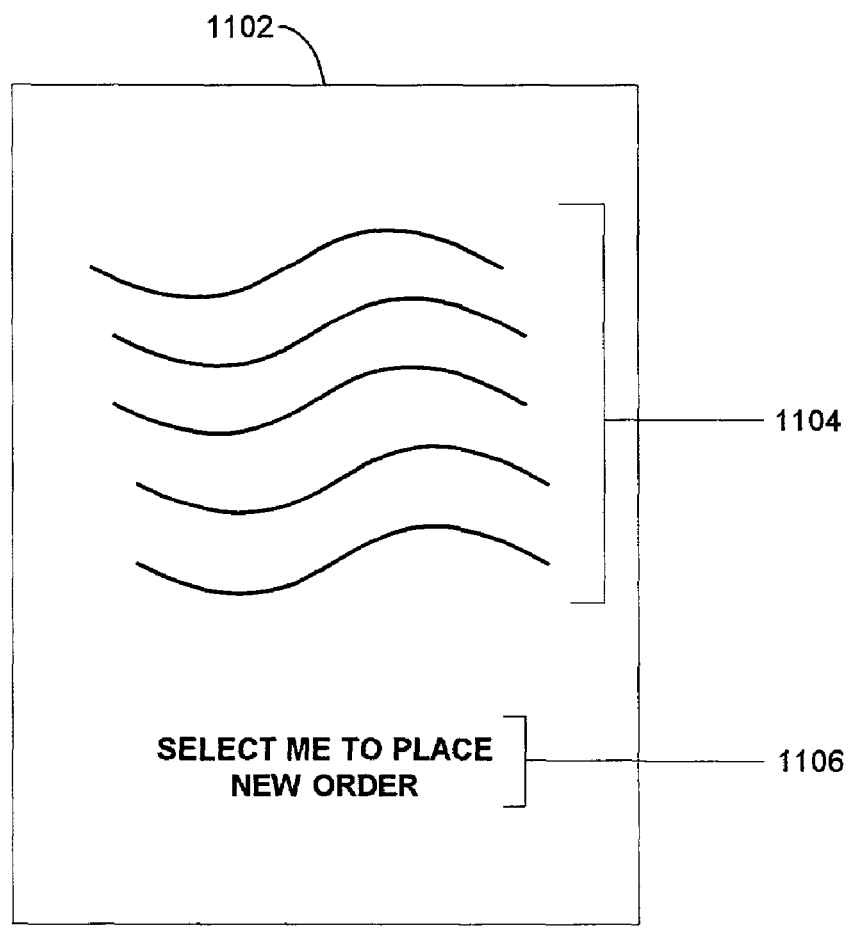
FIG. 11 illustrates an example of a "consumable low" e-mail.

FIG. 11 illustrates an example of a "consumable low" e-mail 1102. As indicated, the e-mail 1102 includes a text portion 1104 and a hyperlink 1106. The text portion 1104 may indicate the identity of the printer that transmitted the consumable low signal as well as certain details (e.g., a model number) pertaining to the cartridge that needs replacement. The hyperlink 1106 is formatted to generate, when selected, an appropriate URL of one of the online shopping resources 922 in order to facilitate an online order for a replacement cartridge.

In one specific implementation, the hyperlink 1106 is further formatted to pass pre-defined parameters, such as common gateway interface (CGI) parameters, to the online shopping resources 922. The parameters define the cartridge that needs replacement. The online shopping resources 922 can respond to these parameters by automatically placing the replacement cartridge in a "virtual shopping basket" and returning a conventional "shopping cart page" that describes the status of the "basket". The page further allows the user to easily place an order for the items in the basket.

Figure 12:
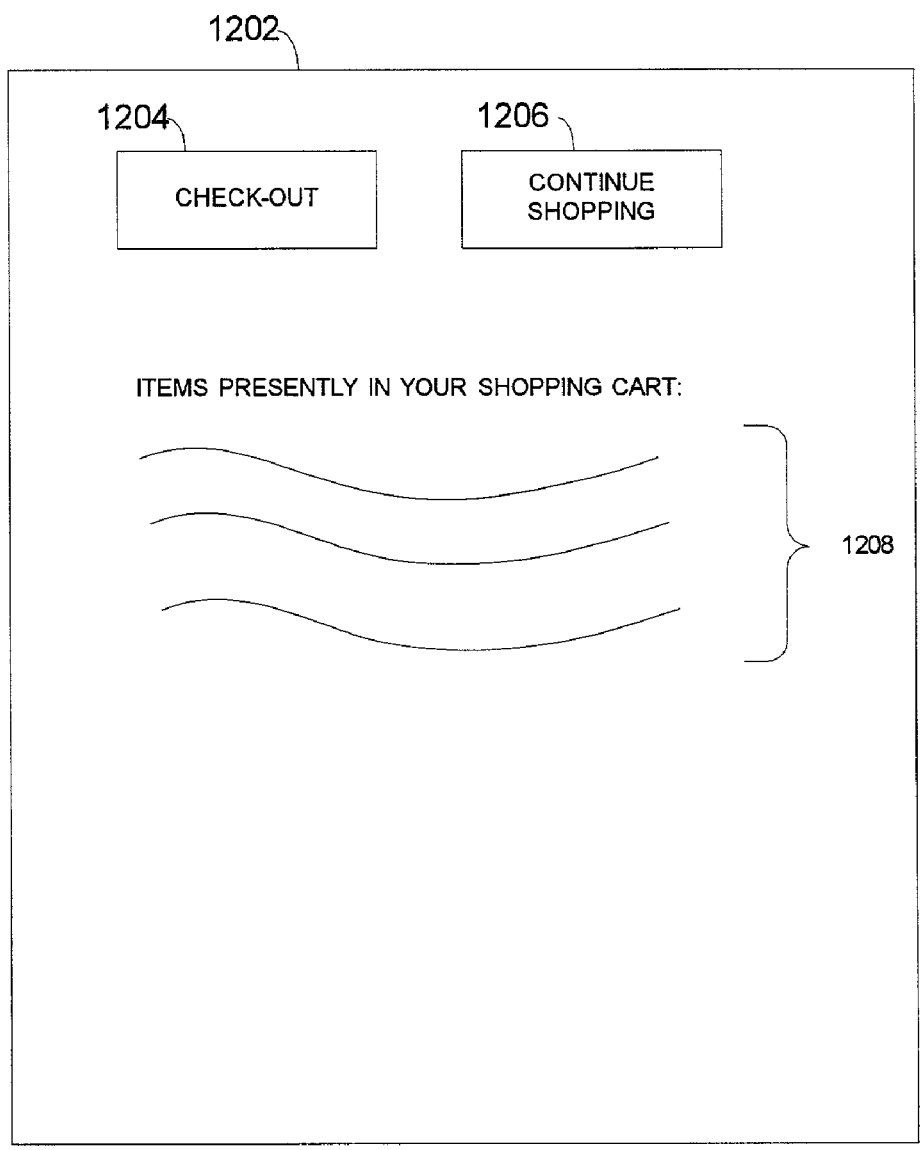
FIG. 12 illustrates an example of a shopping cart page.

FIG. 12 illustrates an example of a shopping cart page 1202 that may be generated by the shopping resources 922. Turning briefly to FIG. 12, the page 1202 includes text 1208 that describes the items (e.g., the replacement cartridge) that are presently in the virtual shopping basket. In addition, a selectable check-out option 1204 is included. If the purchaser selects the check-out option 1204, the items in the virtual shopping cart are automatically purchased.

It is noted that in other implementations, the printing devices 906 monitor themselves and generate the e-mail in response to detecting a consumable low condition.

Activity of Purchasers

As noted above, Purchaser A and Purchaser B are both employees of the Business "A" and are each responsible (at different times) to place orders for replacement cartridges. They both fulfil this responsibility by making use of the Merchant's WEB site 920. This is accomplished, in part, by each purchaser retrieving "consumable low" e-mails as they are generated. After the e-mail is retrieved, the purchaser can then select the e-mails respective hyperlink to facilitate an order for a replacement cartridge.

It can be seen that the cookie management system 402 provides a number of advantages to the two Purchasers as well as to "Business "A". For example, assume that Purchaser "A" makes use of the first WEB client 412 to make a first purchase from the merchant WEB Site 920. During this activity, Purchaser "A" supplies credit card information, a shipping address and establishes certain user preferences. The WEB Site 920 stores this information in its database. In addition, the WEB Site 920 generates a customer ID and associates the customer ID with this information. The customer ID is transmitted back to the first WEB client 412 in the form of a cookie. The cookie is, of course, transmitted to the cookie store 416.

Next, Purchaser "B" makes use of the second WEB Client 414 to make a purchase for a replacement cartridge. By operation of the cookie management system 412, the cookie originally transmitted to the "purchaser A" is transmitted back to the Merchant WEB Site 920. The cookie allows the Merchant WEB Site 920 to identify the credit card information, shipping address and user preferences that were initially supplied by Purchaser "A". This saves Purchaser "B" from having to re-enter this same information. In fact, Purchaser "B" need not have to know some of this information. For example, Purchaser "B" need not have knowledge of the credit card information. This, of course, can be advantageous to a Business that wants to maintain the confidentiality of this type of sensitive information.

Note that in other implementations, only one purchaser is assigned the task of ordering new cartridges for the printing devices. The purchaser, however, can make use of either the first and the second WEB client to perform this task. It can also be seen that by using the cookie management system 402, the single purchaser can establish his/her preferences, credit card information, etc with a merchant site by using only one of the WEB clients. The purchaser then does not have to re-enter this information upon using the other WEB client.

In the embodiments just described, the functionality provided by any one of the programs described may alternatively be provided in whole or in part by hardware components. For example, one or more of the steps illustrated in any of the flow diagrams could be performed by operation of an application specific integrated circuit having appropriate logic gates, a programmable gate array (s) (PGA) or a field programmable gate array (FPGA). It is understood that any of the steps depicted in these flow diagrams may be performed in a different sequence shown. In fact, some steps may be performed concurrently or with partial concurrence.

Furthermore, the present invention may be embodied in the form of a computer readable medium that has any one of the programs described above embodied therein. For example, the memory 434, the memory 444 and the memory 452 may each be considered embodiments of the invention. Importantly, the phrase "computer readable medium" can refer to any medium that can contain, store or propagate computer readable code. Thus, in this context, computer readable medium may refer to a tangible medium such as a CD ROM or an intangible medium, such as signals that are used to communicate the computer readable code over a network or the INTERNET. A computer readable medium may also refer to a carrier wave.

Although several specific embodiments of the invention has been described and illustrated, the invention is not to be limited to specific forms or arrangements of parts so described and illustrated. The invention is limited only by the claims and the equivalents thereof.

What is claimed is:

1. A method of requesting a resource having a URL from a web server, comprising:
a web client receiving input from a user defining the URL;
in response to receiving the user input, the web client automatically transmitting a first request to a remote computer for a cookie that is valid for the URL; then
the web client receiving a first cookie from the remote computer;
the web client transmitting both the first cookie and a request for the resource to the web server;
the web client receiving the resource and a second cookie from the web server; and
in response to receiving the second cookie, the web client transmitting the second cookie to the remote computer for storage.

2. The method of claim 1, wherein the first request transmitting step is performed by transmitting the first request over a network to the remote computer.

3. The method of claim 2, wherein the network comprises the INTERNET.

4. A computing device, comprising:
means for receiving at the computing device, from a first web client, a first cookie that is valid for a first range of URL's, the first cookie provided to the first web client by a web server;
means for receiving at the computing device a first request for a cookie that is valid for a first URL from a second web client different from the first web client; and
means for responding to the first request by transmitting the first cookie from the computing device to the second web client if the first URL is within the first range of URL's, the second web client adapted to transmit the first cookie to the web server, wherein the computing device is different from the first and second web clients and the web server.

5. The computing device of claim 4, wherein the first cookie receiving means is configured to receive the first cookie from the first web client over a network; and
wherein the first request responding means is configured to transmit the first cookie to the second web client over the network.

6. The computing device of claim 5, further comprising:
means for receiving a second cookie that is valid for a second range of URL's from the second web client;
means for receiving a second request that defines a second URL from the first web client; and
means for responding to the second request by transmitting the second cookie to the first web client if the second URL is within the second range of URL's.

7. The computing device of claim 6, further comprising:
means for further responding to the second request by transmitting the first cookie to the first web client if the second URL is within the first range of URL's.

8. The computing device of claim 7, wherein the network comprises the INTERNET.

9. A system comprising:
a first web client;
a second web client; and
a computer remote from the first web client and the second web client;
wherein the first web client is operable to: receive a first resource and a first cookie from a first web server and configured to automatically respond thereto by processing the first resource and transmitting the first cookie to a remote computer; and receive a URL from a user and is responsive thereto by first transmitting a request to the remote computer for a cookie that is valid for the URL; and
wherein the second web client is operable to receive a second resource and a second cookie from a second web server and configured to automatically respond thereto by processing the second resource and transmitting the second cookie to the remote computer; and wherein the remote computer is operable to receive the first cookie from the first web client and to then store the first cookie; and wherein the remote computer is operable to receive the second cookie from the second web client and to then store the second cookie; and wherein the remote computer is operable to receive the request from the first web client and is responsive thereto by: (a) transmitting the stored first cookie to the first web client if the stored first cookie is valid for the URL; and (b) transmitting the stored second cookie to the first web client if the stored second cookie is valid for the URL.

10. The system of claim 9, further comprising:

a monitoring device operable to monitor a first device to detect when the device generates a pre-defined signal and to respond thereto by generating a notification that the signal was generated; and wherein the first web client and the second web client are operable by a user to retrieve the notification.

11. The system of claim 10, wherein the first device is a printer.

12. The system of 11, further comprising:

the printer; and wherein the printer includes a replaceable consumable cartridge; and wherein the printer is operable to generate the signal when a consumable in the cartridge moves below a pre-determined level.

13. The system of claim 12, wherein the printer is a laser printer.

14. A non-transitory computer readable medium having programming thereon for performing a method comprising:

a web client receiving input from a user defining the URL;

in response to receiving the user input, the web client automatically transmitting a first request to a remote computer for a cookie that is valid for the URL; then the web client receiving a first cookie from the remote computer;

the web client transmitting both the first cookie and a request for the resource to the web server;

the web client receiving the resource and a second cookie from the web server; and in response to receiving the second cookie, the web client transmitting the second cookie to the remote computer for storage.

15. A non-transitory computer readable medium having programming thereon for performing a method comprising:

receiving at the computing device, from a first web client, a first cookie that is valid for a first range of URL's, the first cookie provided to the first web client by a web server;

receiving at the computing device a first request for a cookie that is valid for a first URL from a second web client; and responding to the first request by transmitting the first cookie from the computing device to the second web client if the first URL is within the first range of URL's, the second web client adapted to transmit the first cookie to the web server, wherein the computing device is different from the first and second web clients and the web server.

16. A non-transitory computer readable medium having programming thereon for:

making a first web client operable to: receive a first resource and a first cookie from a first web server and configured to automatically respond thereto by processing the first resource and transmitting the first cookie to a remote computer; and receive a URL from a user and is responsive thereto by first transmitting a request to the remote computer for a cookie that is valid for the URL; and making a second web client operable to receive a second resource and a second cookie from a second web server and configured to automatically respond thereto by processing the second resource and transmitting the second cookie to the remote computer; and making a computer remote from the first web client and the second web client operable to: receive the first cookie from the first web client and to then store the first cookie; receive the second cookie from the second web client and to then store the second cookie; and receive the request from the first web client and is responsive thereto by: (a) transmitting the stored first cookie to the first web client if the stored first cookie is valid for the URL; and (b) transmitting the stored second cookie to the first web client if the stored second cookie is valid for the URL.

* * * * *